Jan. 13, 1942.  J. A. LANGE  2,269,946
WORK HOLDER FOR DRILLING BOWLING BALLS
Filed April 20, 1940  3 Sheets-Sheet 1

INVENTOR
JOSEPH A. LANGE
BY
ATTORNEYS

Jan. 13, 1942.    J. A. LANGE    2,269,946
WORK HOLDER FOR DRILLING BOWLING BALLS
Filed April 20, 1940    3 Sheets-Sheet 3

INVENTOR
JOSEPH A. LANGE
BY
James F. Franklin
ATTORNEYS

Patented Jan. 13, 1942

2,269,946

UNITED STATES PATENT OFFICE 2,269,946

WORK HOLDER FOR DRILLING BOWLING BALLS

Joseph A. Lange, Passaic, N. J., assignor to Raybestos-Manhattan, Inc., Passaic, N. J., a corporation of New Jersey Application April 20, 1940, Serial No. 330,635

13 Claims. (Cl. 144—93)

This invention relates to a bowling ball drilling apparatus and more particularly to a work holder facilitating and expediting accurate spacing and drilling of the grip holes in bowling balls.

The method commonly in use for drilling the grip holes in bowling balls is comparatively slow and tedious; and inaccuracies in the span between the holes and the pitch of the holes often result. According to this method commonly in use, the positioning of and the span between the holes are first determined by laying out the centers of the various grip holes on the surface of the ball, using for this purpose a flexible rule or scale and a pair of dividers. The ball is then placed in a clamping fixture on the drill press. To position the ball for drilling each hole, the clamping fixture is then loosened and the ball therein is turned to the required position, the center of the hole to be drilled being placed, by eye, under the center of the drill. The desired pitch of the hole (that is, the amount of angularity between the axis of the hole taken with respect to a radius passing through the hole center at the surface of the ball) is determined by then moving the clamping fixture to the right or to the left, or forward or backward, so as to move the center of the ball away from the axis or center of the drill. The ball is then rotated in the fixture to bring the center of the hole under the center of the drill. In this finally located position of the parts, the hole is then drilled. This method is obviously comparatively slow and tedious and the practice thereof often results in inaccuracies in span and pitch.

The prime object of my present invention resides in the provision of a work holder for drilling bowling balls which is capable of being operated rapidly and accurately. By means of the device of my present invention, laying out of centers is done away with, the aforedescribed tedious and time consuming adjustments are obviated and the resulting inaccuracies are eliminated. In the use of my new device, the ball may be fixedly clamped in position, and the device may then be operated with facility and dispatch for the accurate drilling of holes of any of a variety of spans and pitches.

To the accomplishment of the foregoing and such other objects as may hereinafter appear, the invention further consists in the structural combinations hereinafter sought to be defined in the claims and described more in detail hereinbelow in connection with the appended drawings, in which:

Fig. 8 is a view showing the mounting of some of the essential parts thereof with parts shown in section and other parts broken away for purposes of clarity.

Figures 1, 2, 3, 4:
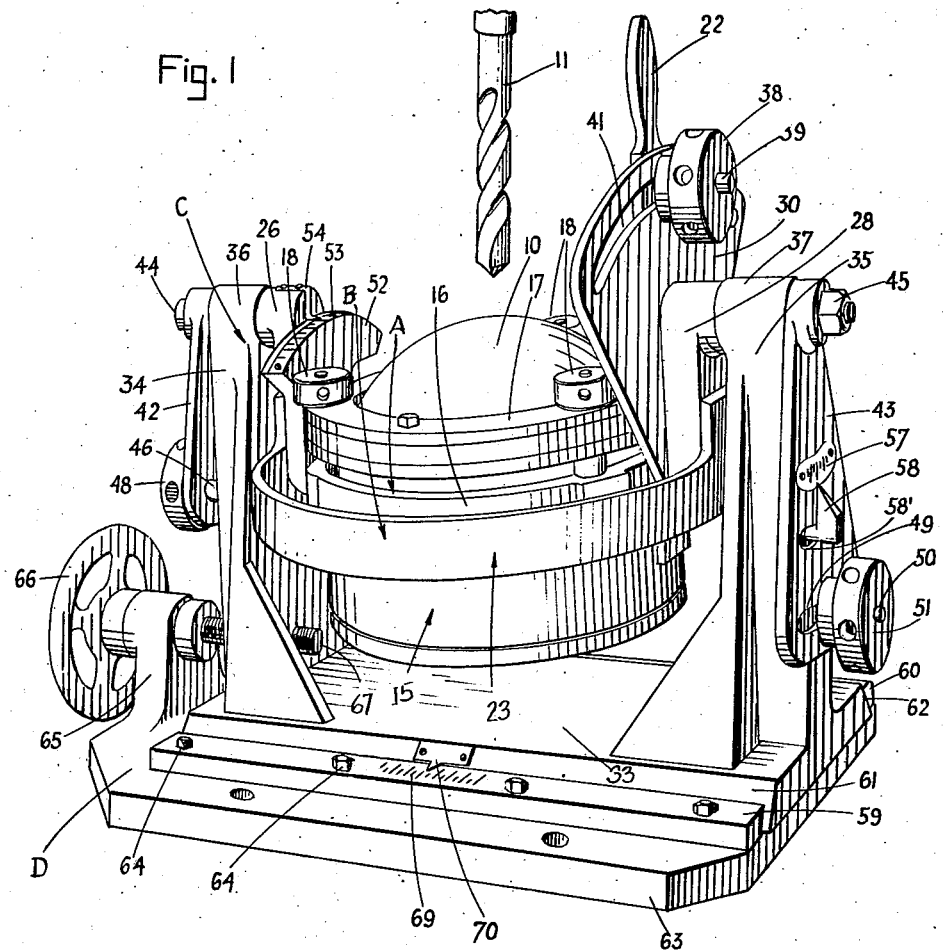
Fig. 1 is a perspective view of the bowling ball work holder embodying my present invention.
Figs. 2 to 4 are diagrammatic views explanatory of the principle of operation thereof.

Referring now more in detail to the drawings, having reference first to Fig. 1 thereof, the work holder for the drilling apparatus comprises in its generic aspect a ball carrier generally designated as A, a mount therefor generally designated as B, the ball carrier A being pivotally mounted for adjustment purposes in the mount B, and a supporting structure generally designated as C, the said mount B being pivotally carried for adjustment purposes on the supporting structure C. The supporting structure C in the preferred form of the invention comprises a carriage bodily movable on a supporting base D. The ball carrier A is adapted to fixedly hold a regulation size bowling ball 10. The ball carrier A is pivotally movable in the mount B for a span adjustment, the mount B is pivotally movable in the supporting structure or carriage C for a pitch adjustment, and the carriage C is bodily movable in the support or base plate D for a web width adjustment. The "span" is the distance between a finger hole and a thumb hole, the "pitch" is the angle between a hole axis and a radius passing through the hole center at the ball surface, and the "web width" is the distance between finger holes. These adjustments are made with respect to a drill 11.

A consideration of the structure and operation of the apparatus will be facilitated from an analysis of the diagrammatic explanatory views of Figs. 2, 3 and 4 of the drawings, which illustrate the operation and use of the jig for drilling a two-hole grip comprising a finger hole and a thumb hole. For this purpose, only the adjustments of the ball carrier A and the mount B need be considered, these adjustments being made with reference to the drill 11. In these figures, the ball carrier A in which the ball is fixedly held (clamped in position) is represented by the wide rectangle, and the mount B is represented by the narrow rectangle. Fig. 2 shows the zero position of the parts, Fig. 3 illustrates the span adjustment made, and Fig. 4 illustrates the pitch adjustment made.

In the zero position of Fig. 2 of the drawings, a given point $x$ on the surface of the ball is located directly beneath the center of the drill 11. Assuming that the selected span for the thumb and finger holes to be drilled is represented by the distance $y$—$z$ of Fig. 3 of the drawings, the ball carrier A is rotated about an axis passing through the center of the ball, the rotation being in one or the other direction depending upon which hole is to be drilled first. If the hole at the point $y$ is to be drilled first, then the rotation is in the counter-clockwise direction as indicated by the arrow $a$. The ball carrier A is rotated an angle corresponding to the arc $x$—$y$ (one-half the span). It will be noted that during this movement, the mount B is stationary, the rotation comprising only the pivotal movement of the ball carrier A in the mount B. This brings the parts in the position shown in Fig. 3. The hole instead of being drilled radially as through a radius $r$, is drilled at an angle to the radius, the usual practice being to make these holes converge towards a point above the center of the ball. Thus it is desired to drill the hole at $y$ along the line $m$ at an angle to the radius $r$, the angle between $r$ and $m$ being the so-called "pitch." To adjust for this pitch, the mount B (with the ball carrier A now fixed or clamped thereto) is now rotated about an axis tangential to the ball 10 at the point $y$, this rotation being counter-clockwise and in the direction of the arrow $b$. With the mount fixed in this adjusted position, the drill is then operated to drill the hole as shown in Fig. 4. For drilling the hole at the point $z$ along the line $n$, the parts are first returned to the zero position shown in Fig. 2 and then the span and pitch adjustments are made in the other directions.

Referring now to the other views of the drawings, the ball carrier A comprises in its preferred structural embodiment a cradle 15 which consists of a cup 16 for receiving the ball, a clamping ring 17 mountable over the ball after it is received by the cup, the ring being clamped by means of the clamping nuts 18 (three in number), which are screwed on to the threaded studs 19, 19 suitably anchored to the cup 16 at the upper face wall thereof. The pivotal mounting of the ball carrier or cradle 15 is obtained by providing the cup 16 with the oppositely positioned trunnions 20 and 21, which are received in bearings provided in the mount B, as will be described presently. The cradle may be moved in its pivotal mounting by manipulating any suitable part thereof, but it is preferred, for convenience, to provide therefor a handle, and to this end the handle arm 22 extending upwardly to some convenient operating point and anchored in any suitable way (as by welding) to the cup 15 at the trunnion 21 is provided.

The mount B in its preferred structural embodiment comprises a ring-shaped saddle structure 23 in which are provided bearing holes 20' and 21' for reception of the cradle trunnions 20 and 21, the said saddle structure being pivotally carried by the supporting structure C by means of oppositely positioned trunnions 24 and 25. The trunnion 24 is fitted to an upright 26 which in turn is secured as by being bolted to an ear 27 integral with the cradle ring itself. The other trunnion 25 may be formed integrally with an upright 28 which is also secured as by being bolted to an ear 29 formed integrally with the cradle ring 23. A swing plate 30 (for cooperation with the handle 22) is provided, and this is preferably secured to the upright 28 and the cradle ring ear 29 by the bolts 31 which are used to bolt together the upright 28 and the ear 29. For securing together the upright 26 and the ear 27, bolts 32 are used. Preferably, as best shown in Fig. 8 of the drawings, the cradle stud bearings 20' and 21' are formed in the elements 26, 28 and 30.

The supporting structure or carriage C comprises a casting having a floor plate 33 and two standards 34 and 35, the upper terminals of the standards being bored to form bearings 36 and 37 for the saddle trunnions 24 and 25.

The pivotal adjustment of the ball carrying cradle A in the saddle mount B is obtained by the manipulation of the handle 22, operation of which moves the cradle 15 in its trunnion support. The handle 22 may be moved from its zero position shown in Fig. 1 and in full lines in Fig. 2 of the drawings, forwardly or rearwardly, to make the span adjustments described in connection with Figs. 2 to 4 of the drawings. The adjustment of the cradle 15 is with respect to the saddle B fixed in its zero position. To secure the ball carrying cradle 15 in any of its adjusted positions, clamping means are provided consisting of a clamping nut 38 which rotates on a threaded stud 39 anchored as at 40 to the swing handle 22, the stud being movable through an arcuate slot 41 provided in the swing plate 30, clamping action being obtained by the clamping of the nut 38 against the contiguous face of the swing plate 30, as will be evident from a reference to Fig. 1 of the drawings. By this operation, an adjustment such as is illustrated in Fig. 3 is obtained, and the ball carrying cradle is clamped or locked in its adjusted position on the mount or saddle B.

The pivotal adjustment of the mount B or saddle 23 is obtained by manipulation of the oppositely positioned swing plates 42 and 43, the swing plate 42 being locked to the trunnion 24 by means of the nut 44, and the swing plate 43 being locked to the trunnion 25 by means of the nut 45. The swing plate 42 is slotted as at 46 to receive a stud 47 anchored to the standard 34, to which stud is threadedly fitted the lock nut 48, and the swing plate 43 is similarly slotted as at 49 to receive the stud 50 anchored to the standard 35, to which stud is threadedly fitted the clamping nut 51. By manipulation of the swing plates 42 and 43 with the nuts loosened, it will be evident that the mount B or saddle ring 23 is adjusted either clockwise or counter-clockwise about the axis of the trunnions 24 and 25, the adjustment being made to any desired or selected extent, and when the adjustment is made, the nuts 48 and 51 may be operated to their clamping position to securely lock or clamp the mount or saddle ring to the supporting structure or carriage C.

It will be, of course, noted that the adjustment of the ball carrier A or cradle 15 on its trunnions 20 and 21 is about an axis which passes through the center of the ball 10, and that the adjustment of the mount B or cradle ring 23 on its trunnions 24 and 25 is about an axis which is tangential to the surface of the ball 10.

Suitable scale means are provided for guiding and indicating the desired and obtained adjustments. The scale elements for the ball carrier A or cradle 15 are preferably arranged to be coincident with a great circle of the ball 10, and this is accomplished by providing a segment-shaped element 52 having the scale readings 53 thereon, the latter arranged in an arc coincident with a great circle of the ball 19, with which cooperates a pointer 54 anchored to the top of the upright 26, the segment-shaped element comprising a plate, the lower terminal 55 of which is bored to receive the cradle trunnion 29 to which it is anchored by the pin 56 (see particularly Fig. 8). With this construction of the scale elements, adjustment of the cradle is indicated at a point or region which is unaltered by the subsequent adjustment of the mount or saddle B. The scale elements for the mount or saddle adjustment may conveniently be provided by a scale plate 57 fixed to the swing plate 43 with which cooperates a pointer 58 extending through an arcuate slot 58' in the swing plate 43 and suitably anchored to the standard 35. With this arrangement, the adjustment for pitch of the mount or saddle B is indicated and read off at the scale 57.

These adjustments of the ball carrying cradle A and the mount or saddle B are used to obtain the span and pitch locations for such points as y and z to provide a two-hole grip, that is, a thumb and finger grip as was described in connection with Figs. 2 to 4 of the drawings. Where a three-hole finger grip is desired, a further adjustment is required, this consisting of the bodily or linear movement of the carriage C. For this purpose, the carriage C is bodily or linearly movable in the base plate D and preferably in tracks defined by the bars 59 and 60 provided with undercut inclined faces which coact with the inclined faces 61 and 62 formed in the front and rear sides of the floor 33 of the carriage C. The bars 59 and 60 are secured to the foundation 63 of the base plate by means of bolts 64, 64. This foundation plate is preferably provided with an integral boss or lug 65 which forms a bearing for the hand wheel 66, the latter being provided with a threaded rod 67, threads of which coact directly with corresponding threads tapped in the bottom region of the standard 34 as is most clearly shown in Fig. 1 of the drawings. It will be apparent that with this construction, rotation of the hand wheel 66 in either one or the other direction will move the carriage C either to the left or to the right as viewed in Fig. 1. To indicate the degree of movement, the scale elements 69 and 70 are provided.

Figure 5:
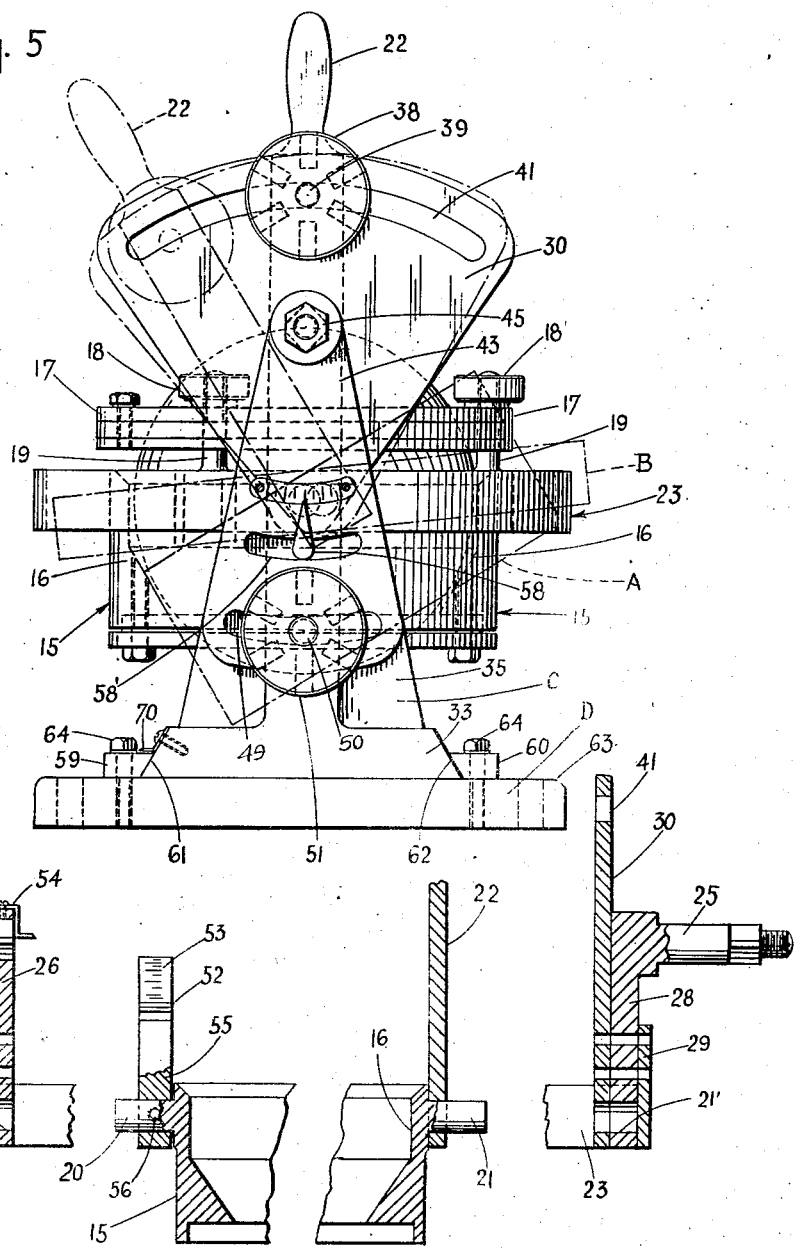
Fig. 5 is a side elevational view thereof showing the parts in different positions of adjustment.
Figure 6:
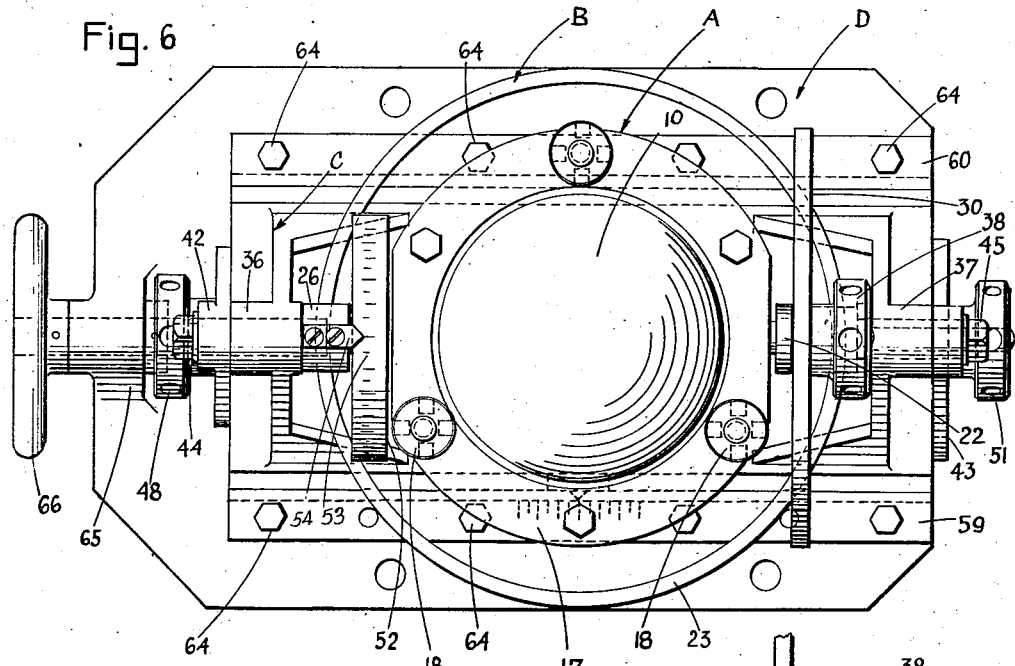
Fig. 6 is a plan view thereof.
Figure 7:
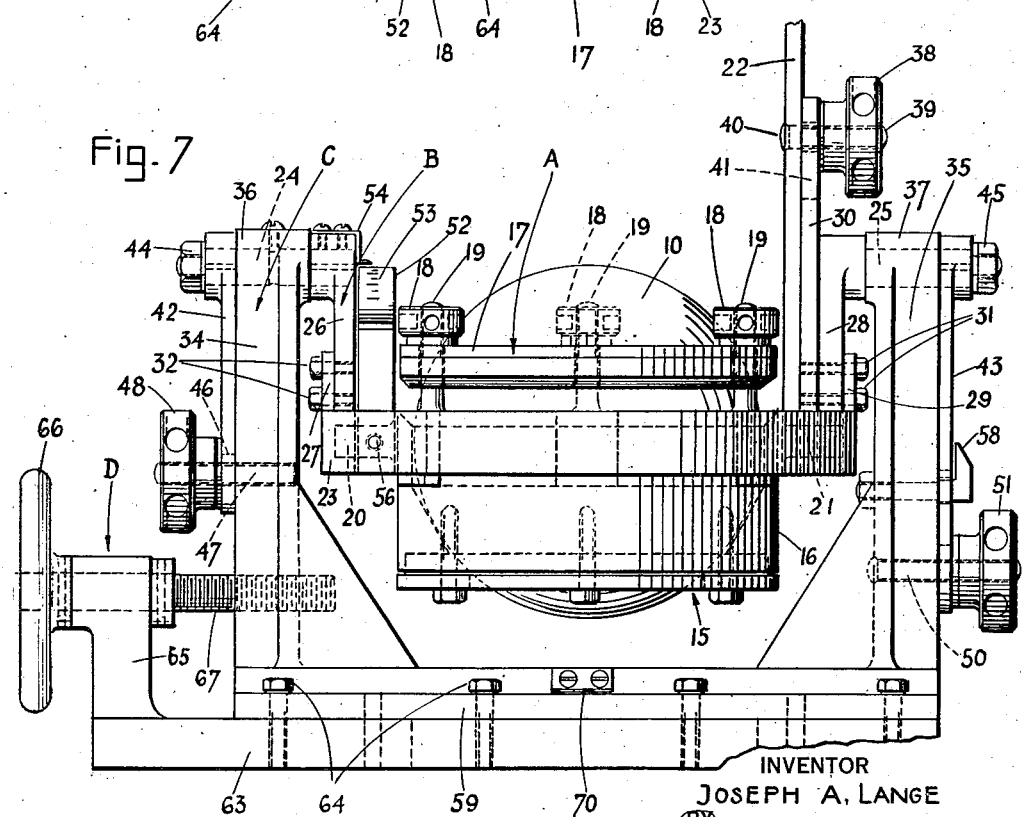
Fig. 7 is a vertical elevational view thereof.

The dotted line representation in Fig. 5 of the drawings of the ball carrying cradle A, the mount or saddle B, and the operating handle 22 show the position of the parts corresponding to the adjustment obtained as illustrated in Fig. 4 of the drawings.

The construction, operation of and the many advantages incident to and inherent in the bowling ball work holder of my present invention will, in the main, be fully apparent from the above detailed description thereof. The apparatus may be used with the facility indicated to drill two-hole grips of any desired span or pitch, three-hole grips of a conventional order, and modified or full off-set thumb grips, etc. This may be explained by a brief description of the use of the apparatus for these various arrangements.

For every drilling operation, the adjustments are first set to the zero point. The three ball clamping nuts 18 and the clamping ring 17 are removed, and the ball 19 is placed in the cup 16 with a given point of the ball beneath the center of the drill 11. The clamping ring is replaced and the clamping nuts are tightened to fixedly secure the ball in position. The device is then ready for the various adjustments.

For drilling a two-hole grip, the following instructions are observed: For drilling the finger hole, the span clamp nut 38 is loosened and the swing handle 22 is moved forward a distance as indicated on the span scale 53, equal to one-half the span plus one-half the diameter of the finger hole. The span clamp nut 38 is then tightened. The pitch adjustment clamping nuts 48 and 51 are then loosened and the saddle B is swung back to the desired pitch as indicated on the pitch scale 57. The pitch clamping nuts 48 and 51 are then tightened. The hole is then drilled with the proper size drill to the desired depth. The parts are then returned to their zero positions. For drilling the thumb hole, the same procedure is followed as for the finger hole set-up, except the span adjustment is swung backward from the zero point a distance equal to one-half the span plus one-half the diameter of the thumb hole; and for the pitch of the thumb hole, the saddle is swung forward instead of backward.

For drilling a conventional three-hole grip, the following procedure is observed: For the left finger hole, the swing handle 22 is swung forward a distance of one-half the span of the left finger hole plus one-half the diameter of the left finger hole minus $\tfrac{1}{16}$". The clamping nut 38 is then tightened. The hand wheel 66 is then operated to move the carriage C to the right a distance equal to one-half the diameter of the left finger hole plus one-half the width of the web (space between the finger holes). The pitch adjustment is then moved backward the desired amount and the nuts 48 and 51 are tightened. The hole is drilled and the adjustments are then returned to zero. For the right finger hole, the swing handle 22 is moved forward a distance equal to the difference between the right finger span and one-half the left finger span plus one-half diameter of the right finger hole minus $\tfrac{1}{16}$". The clamping nut 38 is then tightened. The hand wheel 66 is then operated to move the carriage C to the left a distance equal to one-half the diameter of the right finger hole plus one-half the width of the web. The pitch is then adjusted, the nuts are clamped and the hole is drilled, after which the adjustments are returned to the zero positions. For the thumb hole, the swing lever 22 is then moved backward a distance equal to one-half the span of the left finger hole plus one-half the diameter of the thumb hole. The pitch is then adjusted by swinging the saddle forwardly. The nuts are tightened and the hole is drilled.

Modified off-set thumb grip and full off-set thumb grip adjustments may also be made by following simple instructions. It will be noted that all of the grip holes are drilled without changing the position of the ball in the cup or cradle. With a little practice, the operations are carried out with dispatch and with unerring accuracy.

It will be obvious that the principles of the invention may be employed in the combination as disclosed or any suitable sub-combinations thereof, all as set forth in the following claims.

I claim:

1. A work holder for drilling bowling balls comprising a ball carrier adapted to fixedly hold a bowling ball, a mount for the ball carrier, a supporting structure for the mount, the said ball carrier being pivotally carried by said mount for movement about a center axis of the ball, and the said mount being pivotally carried by the said supporting structure for movement about a tangent axis of the ball.

2. A work holder for drilling bowling balls comprising a ball carrier adapted to fixedly hold a bowling ball, a mount for the ball carrier, a carriage for the mount, and a support, the said ball carrier being pivotally carried by said mount for movement about a center axis of the ball, the said mount being pivotally carried by the said carriage for movement about a tangent axis of the ball, and the said carriage being bodily movable on said support.

3. A work holder for drilling bowling balls comprising a supporting structure, a mount pivotally carried by the supporting structure, means for moving the mount about its pivot for adjustment purposes and for securing the same in adjusted position, a ball carried pivotally carried by said mount for movement about a center axis of the ball, and means for moving the ball carrier about its pivot for adjustment purposes and for securing the same in its adjusted position, the pivot axis of the mount on said supporting structure being tangential to the surface of the ball held in said carrier.

4. A work holder for drilling bowling balls comprising a support, a carriage bodily movable on said support, means for moving the carriage on the support for adjustment purposes and for securing the same in adjusted position, a mount pivotally carried by the carriage, means for moving the mount about its pivot for adjustment purposes and for securing the same in adjusted position, a ball carrier pivotally carried by said mount for movement about a center axis of the ball, means for moving the ball carrier about its pivot for adjustment purposes and for securing the same in its adjusted position, the pivot axis of the mount on said supporting structure being tangential to the surface of the ball held in said carrier.

5. A work holder for drilling bowling balls comprising a supporting structure, a mount pivotally suspended on the supporting structure, the said mount being movable about its pivot for adjustment purposes, and a ball carrier pivotally suspended on said mount, the said ball carrier being movable about its pivot for adjustment purposes, the pivot axis for the mount being tangential to the surface of a ball held in said carrier, and the pivot axis for the ball carrier being through the ball center.

6. A work holder for drilling bowling balls comprising a support, a carriage movable in said support, a mount pivotally suspended on the carriage, the said mount being movable about its pivot for adjustment purposes, and a ball carrier pivotally suspended on said mount, the said ball carrier being movable about its pivot for adjustment purposes, the pivot axis for the mount being tangential to the surface of a ball held in said carrier, and the pivot axis for the ball carrier being through the ball center.

7. In a work holder for drilling bowling balls, a ball carrier adapted to fixedly hold a bowling ball, a mount for the ball carrier, the ball carrier being pivotally carried for adjustment purposes by said mount for movement about an axis passing through the center of said ball, and scale elements on said carrier and mount arranged on a great circle of said ball for indicating the amount of the said adjustment, and means for pivotally supporting said mount for adjustment purposes for movement about an axis tangential to said ball.

8. In a work holder for drilling bowling balls, a ball carrier adapted to hold a bowling ball, a mount for the ball carrier, and a supporting structure for the mount, the said mount being pivotally carried by the supporting structure for movement about an axis tangential to the surface of the ball held in said carrier.

9. In a work holder for drilling bowling balls, a ball carrier adapted to hold a bowling ball, a mount for the ball carrier, and a movable carriage for the mount, the said mount being pivotally suspended on the carriage for movement about an axis tangential to the surface of the ball held in said carrier.

10. A work holder for drilling bowling balls comprising a supporting structure having oppositely positioned standards, a saddle provided with trunnions pivotally mounted in said standards, and a ball carrying cradle provided with trunnions pivotally mounted in said saddle for movement about a center axis of the ball, the pivotal axis of said saddle being tangential to the surface of said ball.

11. A work holder for drilling bowling balls comprising a bodily movable carriage having oppositely positioned standards, a saddle provided with trunnions pivotally mounted in said standards, and a ball carrying cradle provided with trunnions pivotally mounted in said saddle, the pivotal axis of said cradle being through the center of a ball carried by the cradle and the pivotal axis of said saddle being tangential to the surface of said ball.

12. A work holder for drilling bowling balls comprising a supporting structure having oppositely positioned standards, a saddle provided with trunnions pivotally mounted in said standards, the said saddle being pivotally movable for adjustment purposes, means for securing the saddle to said structure in adjusted positions, a ball carrying cradle provided with trunnions pivotally mounted in said saddle, the said cradle being pivotally movable for adjustment purposes about a center axis of the ball and means for securing the cradle to said saddle in adjusted positions, the pivotal axis of said saddle being tangential to the surface of said ball.

13. A work holder for drilling bowling balls comprising a supporting base, a carriage bodily movable on said base for adjustment purposes, said carriage having oppositely positioned standards, a saddle provided with trunnions pivotally mounted in said standards, the said saddle being pivotally movable for adjustment purposes, means for securing the saddle to said carriage in adjusted positions, a ball carrying cradle provided with trunnions pivotally mounted in said saddle, the said cradle being pivotally movable for adjustment purposes about a center axis of the ball, and means for securing the cradle to said saddle in adjusted positions, the pivotal axis of said saddle being tangential to the surface of said ball.

JOSEPH A. LANGE.